(12) United States Patent
Bakran et al.

(10) Patent No.: US 7,480,160 B2
(45) Date of Patent: Jan. 20, 2009

(54) TRACTION CONVERTER HAVING A LINE-SIDE FOUR-QUADRANT CONTROLLER, AND METHOD THEREFOR

(75) Inventors: Mark-Matthias Bakran, Erlangen (DE); Hans-Günter Eckel, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 178 days.

(21) Appl. No.: 11/572,294

(22) PCT Filed: Jul. 20, 2005

(86) PCT No.: PCT/EP2005/053512

§ 371 (c)(1),
(2), (4) Date: Jan. 18, 2007

(87) PCT Pub. No.: WO2006/015936

PCT Pub. Date: Feb. 16, 2006

(65) Prior Publication Data

US 2007/0183177 A1    Aug. 9, 2007

(30) Foreign Application Priority Data

Jul. 23, 2004    (DE) .................... 10 2004 035 789

(51) Int. Cl.
   *H02M 5/458*    (2006.01)
   *H02M 5/40*    (2006.01)
(52) U.S. Cl. .......................... 363/37; 363/35
(58) Field of Classification Search .............. 363/34, 363/35, 36, 37, 82, 84, 85, 88, 126, 127, 363/128

See application file for complete search history.

(56) References Cited

U.S. PATENT DOCUMENTS

| | | | |
|---|---|---|---|
| 3,555,396 A * | 1/1971 | Kalman | 363/35 |
| 4,027,226 A * | 5/1977 | Studtmann | 363/128 |
| 4,247,888 A * | 1/1981 | Angquist | 363/47 |
| 6,275,393 B1 * | 8/2001 | Baudelot et al. | 363/37 |

FOREIGN PATENT DOCUMENTS

| | | |
|---|---|---|
| DE | 196 14 627 A1 | 10/1997 |
| DE | 198 177 52 A1 | 10/1999 |

OTHER PUBLICATIONS

Veröffentlichung mit dem Tital: "Power Diodes with Active Control of Emitter Efficiency", Dirk Drücke and Dieter Silbar, Jun. 4-7, 2001, pp. 231-234, XP010551608.

* cited by examiner

*Primary Examiner*—Gary L Laxton
(74) *Attorney, Agent, or Firm*—Henry M. Feiereisen

(57) ABSTRACT

A traction current converter includes a line-side four-quadrant converter which is provided with turn-off power semiconductors that are implemented as current converter valves. Each of the power semiconductors is connected electrically back-to-back in parallel to a corresponding power diode. A regulating device has an output side which is connected to control terminals of the power semiconductors. Each of the power diodes is implemented as controllable power diode which can be connected on the control system side to a corresponding diode control device having an input side which is connected to control outputs of the regulating device. In this way, the four-quadrant converter of a traction current converter can be reliably operated without having to use power semiconductor modules with enlarged diode chip surface.

12 Claims, 2 Drawing Sheets

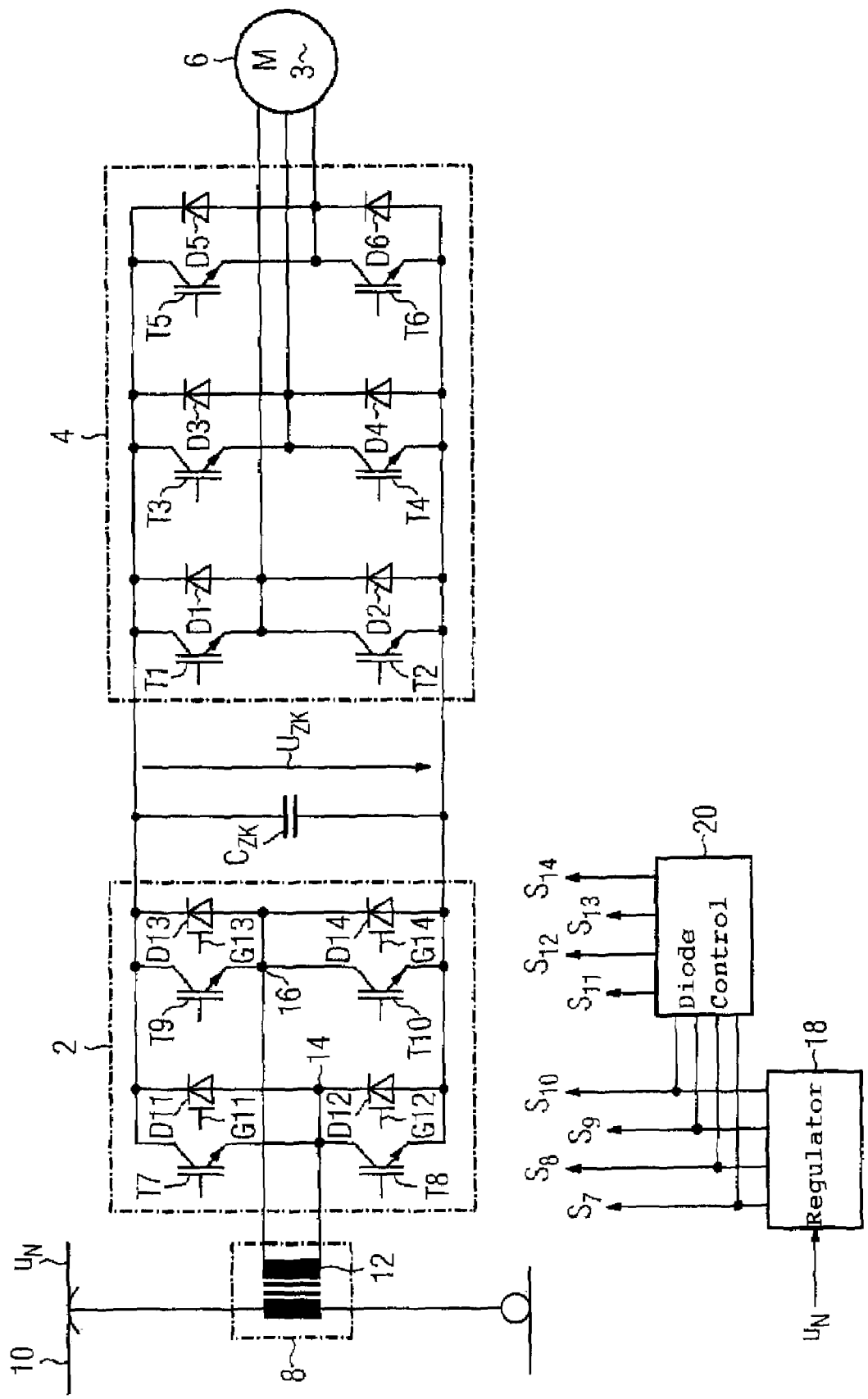

TRACTION CONVERTER HAVING A LINE-SIDE FOUR-QUADRANT CONTROLLER, AND METHOD THEREFOR

BACKGROUND OF THE INVENTION

The invention relates to a traction converter having a line-side four-quadrant controller, which has power semiconductors which can be switched off as converter valves, each of which has a power diode connected electrically back-to-back in parallel with it, and having a regulation device which is linked on the output side to control connections for the power semiconductors which can be switched off.

In the case of traction drives, one aim is to keep the vehicle wattles-component demand as low as possible. A further aim is to ensure that signal circuits and telecommunications links are not influenced by current distortion, such as that which can occur in particular in the case of converter drives. In order to be as compatible as possible with the power supply system, traction converters are equipped with a line-side pulse-controlled converter. A line-side pulse-controlled converter such as this for a traction converter which generates a required DC voltage from a single-phase line voltage is referred to as a four-quadrant controller. The motors in the traction drive are fed via a load-side pulse-controlled inverter, which is fed from the DC voltage.

Power semiconductors which can be switched off are used with corresponding freewheeling diodes as converter valves for the four-quadrant controller. These freewheeling diodes are power diodes which are each connected electrically back-to-back in parallel with the corresponding power semiconductor. Power semiconductors and associated power diodes are normally arranged in a power semiconductor module. By way of example, Insulated Gate Bipolar Transistors (IGBT) are used as power semiconductors which can be switched off. pin diodes are used as power diodes, since the reverse voltages which occur are more than 100 V.

These pin diodes have a conducting-state voltage of about 2 V. The conducting-state voltage of high-blocking capacity pin diodes is higher than this, typically 4 V. In the case of pin diodes, the transition from the conducting-state range to the reverse-biased range does not take place instantaneously, since the charge that is stored in the pn junction must first of all be dissipated. The time required to do this is the storage time, which becomes greater the higher the conducting-state current was before the transition. For power diodes, this storage time is in the microsecond range.

During operation of the four-quadrant controller, in comparison to the pulse-control inverter on the motor side, the power diodes carry current for the majority of the time, and the power semiconductors carry current for the minority of the time. This leads to overloading of the power diodes when the power semiconductors are utilized well. In the past, this problem has been solved by using power semiconductor modules with an enlarged diode chip area.

Controllable diodes are known from the publication entitled: "Power Diodes with Active Control of Emitter Efficiency" by Dirk Drücke and Dieter Silber. These controllable diodes, which are also referred to as emitter controlled diodes (ECD), can assume one of two states by means of a control signal. In one stage, the amount of stored charge is very high and the conducting-state voltage is very low, while in the other state the amount of stored charge corresponds to a rapidly switching diode and the conducting-state voltage is higher. The first-mentioned state is reached as soon as a control signal that is applied to the control connection of the diode is low. When this control signal level changes from low to high, then the diode changes to the state with a low storage charge.

The invention is now based on the object of improving a known traction converter having a line-side four-quadrant controller in such a manner that there is no longer any need to use power semiconductor modules with an enlarged diode chip area.

SUMMARY OF THE INVENTION

According to the invention, this object is achieved by a traction converter having a line-side four-quadrant controller, which has power semiconductors which can be switched off as converter valves, each of which has a power diode connected electrically back-to-back in parallel with it and having a regulation device which is linked on the output side to control connections for the power semiconductors which can be switched off, wherein a controllable power diode is in each case provided as the power diode and these are connected on the control side to a corresponding diode control device, which is linked on the input side to control outputs of the regulation device.

According to the invention, controllable diodes are used as freewheeling diodes for the four-quadrant controller for the traction converter, are connected on the control side to a corresponding diode control device, and are linked on the input side to control outputs of a regulation device for the power semiconductors which can be switched off in the active input converter. These controllable diodes are driven in such a manner that they are changed to the state of low conducting-state voltage when a current is passing through the diode or the power semiconductor which can be switched off and is connected back-to-back in parallel. A controllable diode is changed to the state of low storage charge shortly before a power semiconductor which can be switched off and is connected electrically in series with it is switched on. This considerably improves the current-carrying capacity of the power diode, without its reverse recovery behavior being made worse in the process.

Reliable operation of a four-quadrant controller for a traction converter is thus possible without having to use power semiconductor modules with an enlarged diode chip area.

BRIEF DESCRIPTION OF THE DRAWINGS

The invention will be explained further with reference to the drawing, in which one embodiment of a traction converter according to the invention is illustrated schematically, and in which:

FIG. 2 shows an embodiment according to the invention of this traction converter.

DETAILED DESCRIPTION OF PREFERRED EMBODIMENTS

Figure 1:
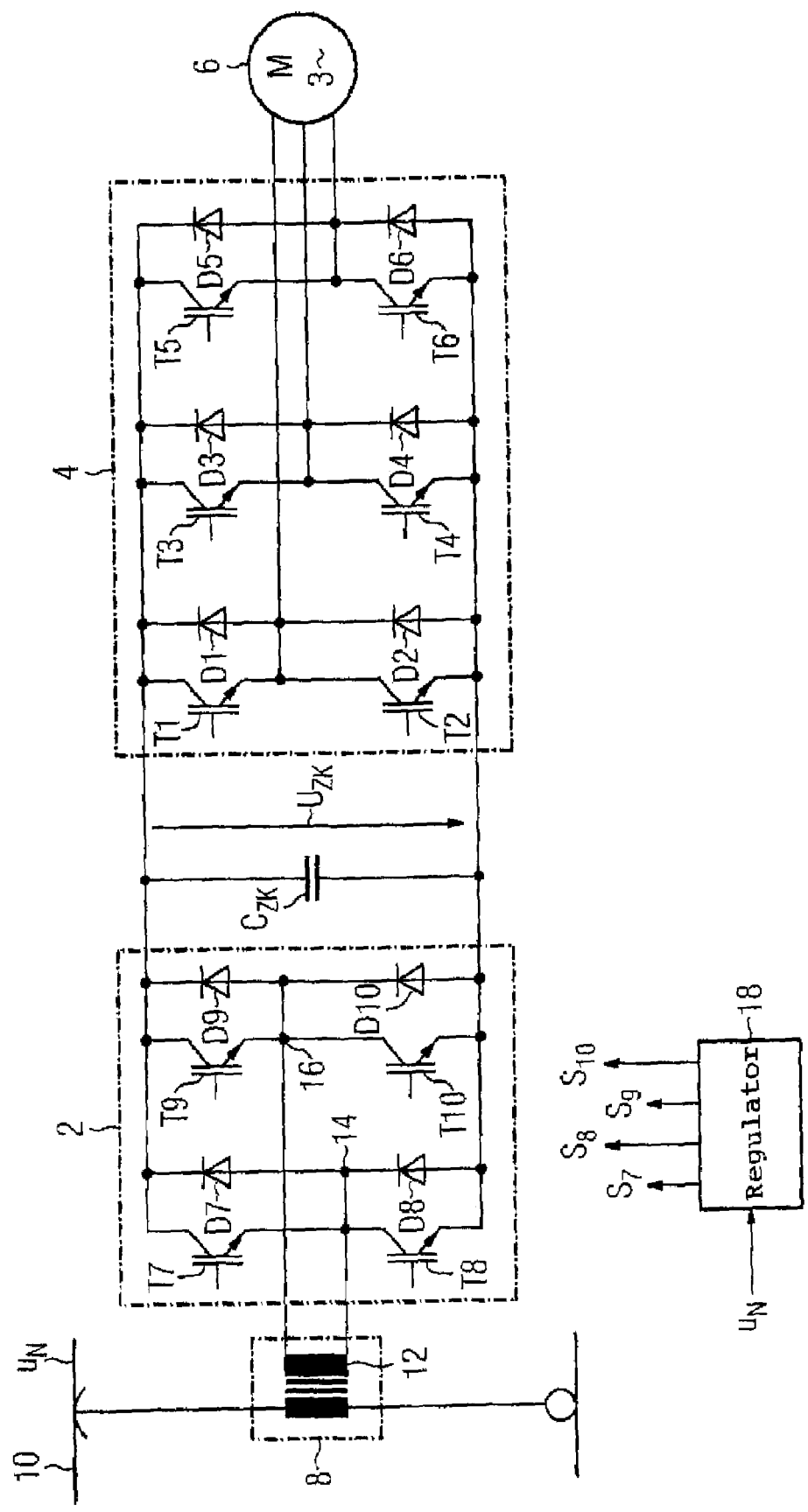
FIG. 1 shows a known embodiment of a traction converter.

The known traction converter as shown in FIG. 1 has a four-quadrant controller 2 on the line side, and a self-commutating pulse-controlled converter 4 on the load side, with the DC-voltage sides of these two converters 2 and 4 being coupled by means of a DC-voltage intermediate circuit. Only one intermediate-circuit capacitor $C_{ZK}$ in the DC-voltage intermediate circuit is shown, for the sake of clarity. An AC machine 6 is connected to the outputs of the self-commutating pulse-controlled converter 4. On the AC-voltage side, the four-quadrant controller 2 is electrically conductively connected to an overhead wire 10 by means of a traction transformer 8. The secondary winding 12 of this traction transformer 8 is in each case electrically conductively connected to an AC-voltage connection 14 or 16 of this four-quadrant controller 2. This four-quadrant controller 2 converts a single-phase line voltage $U_N$ to a predetermined intermediate-circuit voltage $U_{ZK}$, from which a voltage system which is matched to the requirements of the AC machine 6, for example a three-phase voltage system of variable amplitude and frequency, is then generated.

In this known embodiment of the traction converter, power semiconductors T1 to T6 and T7 to T10 which can be switched off, in particular Insulated Gate Bipolar Transistors (IGBT) are in each case used as converter valves for the self-commutating pulse-controlled converter 4 and as converter valves for the four-quadrant controller 2. Respective power diodes D1 to D6 and D7 to D10 are electrically connected back-to-back in parallel with the respective power semiconductors T1 to T6 and T7 to T10 which can be switched off. These diodes D1 to D6 and D7 to D10 each form a freewheeling diode. Commercially available power semiconductor modules already have an internal freewheeling diode. In consequence, there is no need to separately connect any power diodes. The illustrated power semiconductors T1 to T10 together with the respective corresponding power diodes D1 to D10 thus in each case form one module.

The power flow direction that is relevant for the converter design is from the feeding power supply system via the traction transformer 8, the four-quadrant controller 2 and the self-commutating pulse-controlled converter 4 to the three-phase machine 6. In the self-commutating pulse-controlled converter 4, this leads to the power semiconductors T1 to T6 which can be switched off predominantly carrying a load current, during motor operation of the pulse-controlled converter 4. This matches the rating of the diodes D1 to D6 and of the power semiconductors T1 to T6 in the power semiconductor modules. In contrast, the diodes D7 to D10 carry the majority of the current in the four-quadrant controller 2 (generator operation). In order to likewise allow power semiconductor modules to be used, it is necessary to use power semiconductor modules with enlarged diode chip areas. A regulation device 14 is provided for control of the power semiconductor modules for the four-quadrant controller 2 and is supplied with the single-phase line voltage $u_N$. By way of example, a microcontroller can be provided as the regulation device 14, and is accommodated in a control and regulation device for the traction converter.

One embodiment of a traction converter according to the invention is illustrated schematically in FIG. 2. This embodiment according to the invention differs from the embodiment of the known traction converter illustrated in FIG. 1 in that controllable power diodes D11 to D14 and a diode control device 20 are now provided instead of the power diodes D7 to D10. This diode control device 20 is in each case connected on the output side to a control input G11 to G14 of the controllable diodes D11 to D14, and is in each case connected on the input side to an output of the regulation device 18, at which the control signals S7 to S10 for the power semiconductors T7 to T10 which can be switched off for the four-quadrant controller 2 are produced. The control signals S11 to S14 for the controllable diodes D11 to D14 are generated by means of this diode control device 20, as a function of the control signals S7 to S10. For this reason, it is advantageous for the diode control device 20 to be integrated in the regulation device 18. However, this diode control device 20 can also be split such that each controllable power diode D11 to D14 has an associated diode control device. It is likewise possible to split this diode control device 20 such that each bridge arm with the power semiconductors T7, T8 and T9, T10 which can be switched off together with the respective associated controllable power diodes D11, D12 and D13, D14 is associated with one diode control device. In the case of these cited ways of splitting the diode control device 20, it is advantageous for this diode control device in each case to be fitted directly to the module.

According to the invention, these diodes D11 to D14 are driven such that they are changed to the state with a low conducting-state voltage when a current is flowing through the diodes D11 to D14 or through the power semiconductors T7 to T10 which are connected back-to-back in parallel. By way of example, this can be achieved most easily by the respective diode D11, D12, D13 or D14 being changed to the state with a low conducting-state voltage whenever the respective power semiconductor T7, T8, T9 or T10 which can be switched off and is connected back-to-back in parallel is switched on. Shortly before an opposite power semiconductor T8, T10, T7 or T9 which can be switched off is intended to be switched on, a respective controllable diode D11, D12, D13 or D14 is changed from the state with a low conducting-state voltage to the state of low storage charge (reverse recovery charge).

The use of the controllable diodes D11 to D14 as freewheeling diodes for the power semiconductors T7 to T10 which can be switched off for the four-quadrant controller 2 for the traction converter increases the current-carrying capacity of the freewheeling diodes in comparison to an embodiment with pin diodes. Reliable operation of this traction converter is therefore possible without having to use power semiconductor modules with enlarged diode chip areas.

What is claimed is:

1. A traction converter, comprising:
    a line-side four-quadrant controller, said four-quadrant controller including a plurality of power semiconductors adapted to be switched off as converter valves, and a plurality of power diodes connected electrically back-to-back in parallel to the power semiconductors in one-to-one correspondence, wherein each power diode is implemented as a controllable power diode;
    a regulation device having control outputs connected to control connections of the power semiconductors; and
    a plurality of diode control devices connected to a control side of the controllable power diodes in one-to-one correspondence, said diode control devices having an input side connected to control outputs of said regulation device.

2. The traction converter of claim 1, wherein the four-quadrant controller is linked on an AC voltage side to a secondary winding of a traction transformer.

3. The traction converter of claim 1, wherein one power semiconductor of the power semiconductors and a corresponding controllable diode are integrated into a module.

4. The traction converter of claim 1, wherein the regulation device and the diode control devices form a unit.

5. The traction converter of claim 1, wherein the power semiconductor is an insulated gate bipolar transistor.

6. A traction converter, comprising:
    a line-side four-quadrant controller which includes a power semiconductor adapted to be switched off as converter valves, and a power diode connected electrically back-to-back in parallel to the power semiconductor, wherein the power diode is implemented as a controllable power diode;

a regulation device having an output side connected to a control connection of the power semiconductor; and a diode control device connected to a control side of the controllable power diode and having an input side connected to a control output of the regulation device.

7. The traction converter of claim 6, wherein the four-quadrant controller is linked on an AC voltage side to a secondary winding of a traction transformer.

8. The traction converter of claim 6, wherein the power semiconductor and the controllable diode are integrated into a module.

9. The traction converter of claim 6, wherein the regulation device and the diode control device form a unit.

10. The traction converter of claim 6, wherein the power semiconductor is an insulated gate bipolar transistor.

11. A method for controlling controllable power diodes of a four-quadrant controller for a traction converter, comprising the steps of:

changing the state of a controllable diode of the four-quadrant controller to a state with a low conducting-state voltage precisely at a same time that a corresponding power semiconductor which can be switched off in the four-quadrant controller is switched on; and changing the state of the controllable diode to a state with a low storage charge shortly before the power semiconductor located in a bridge arm of the four-quadrant controller in opposite relationship to the controllable diode is switched on.

12. The method of claim 11, further comprising the step of generating a control signal for the controllable diode as a function of a control signal for the power semiconductor.

* * * * *